(12) United States Patent
Nishimura et al.

(10) Patent No.: US 11,923,505 B2
(45) Date of Patent: Mar. 5, 2024

(54) ELECTROLYTE COMPOSITION AND RECHARGEABLE BATTERY

(71) Applicant: LG ENERGY SOLUTION, LTD., Seoul (KR)

(72) Inventors: Takuya Nishimura, Tokyo (JP); Hiroki Mikuni, Tokyo (JP)

(73) Assignee: LG ENERGY SOLUTION, LTD., Seoul (KR)

( * ) Notice: Subject to any disclaimer, the term of this patent is extended or adjusted under 35 U.S.C. 154(b) by 357 days.

(21) Appl. No.: 16/617,104

(22) PCT Filed: May 31, 2018

(86) PCT No.: PCT/JP2018/021007
§ 371 (c)(1),
(2) Date: Nov. 26, 2019

(87) PCT Pub. No.: WO2018/221669
PCT Pub. Date: Dec. 6, 2018

(65) Prior Publication Data
US 2020/0259214 A1    Aug. 13, 2020

(30) Foreign Application Priority Data

Jun. 1, 2017  (JP) .................................. 2017-109371

(51) Int. Cl.
| | | |
|---|---|---|
| *H01M 10/0565* | (2010.01) | |
| *C08K 3/36* | (2006.01) | |
| *C08K 9/06* | (2006.01) | |
| *H01M 10/052* | (2010.01) | |
| *H01M 10/0568* | (2010.01) | |

(Continued)

(52) U.S. Cl.
CPC .......... *H01M 10/0565* (2013.01); *C08K 3/36* (2013.01); *C08K 9/06* (2013.01); *H01M 10/052* (2013.01); *H01M 10/0568* (2013.01); *H01M 10/0569* (2013.01); *H01M 10/0585* (2013.01); *H01M 2300/0082* (2013.01); *H01M 2300/0091* (2013.01)

(58) Field of Classification Search
CPC .......... H01M 10/0565; H01M 10/052; H01M 10/0568; H01M 10/0569; H01M 10/0585; H01M 2300/0082; H01M 2300/0091
See application file for complete search history.

(56) References Cited

U.S. PATENT DOCUMENTS

2010/0216031 A1* 8/2010 Machida ........... H01M 10/0565
429/320
2010/0239916 A1* 9/2010 Bhattacharryya ..........................
H01M 10/0565
429/300

(Continued)

FOREIGN PATENT DOCUMENTS

| JP | 2000-164254 A | 6/2000 |
|---|---|---|
| JP | 2001-229966 A | 8/2001 |

(Continued)

*Primary Examiner* — Osei K Amponsah
(74) *Attorney, Agent, or Firm* — Bryan Cave Leighton Paisner LLP (57) ABSTRACT

There is disclosed an electrolyte composition comprising one or two or more polymers, oxide particles having a hydrophobic surface, at least one electrolyte salt selected from the group consisting of a lithium salt, a sodium salt, a calcium salt, and a magnesium salt, and an ionic liquid.

12 Claims, 5 Drawing Sheets

(51) Int. Cl.
    *H01M 10/0569*   (2010.01)
    *H01M 10/0585*   (2010.01)

(56) References Cited

U.S. PATENT DOCUMENTS

| | | | | |
|---|---|---|---|---|
| 2015/0044573 | A1* | 2/2015 | Roschenthaler | H01G 11/62 |
| | | | | 429/339 |
| 2017/0084949 | A1 | 3/2017 | Yokoyama et al. | |
| 2018/0241083 | A1* | 8/2018 | Takami | H01M 4/131 |

FOREIGN PATENT DOCUMENTS

| | | |
|---|---|---|
| JP | 2001229966 | 8/2001 |
| JP | 2003-157719 A | 5/2003 |
| JP | 2003157719 | 5/2003 |
| JP | 2007-141467 A | 6/2007 |
| JP | 2007-280948 A | 10/2007 |
| JP | 2007280948 | 10/2007 |
| JP | 2008-130229 A | 6/2008 |
| JP | 2010-198757 A | 9/2010 |
| JP | 2010198757 | 9/2010 |
| JP | 2011-034870 A | 2/2011 |
| JP | 2011034870 | 2/2011 |
| JP | 2011-134459 A | 7/2011 |
| JP | 2011134459 | 7/2011 |
| JP | 2017-059432 A | 3/2017 |
| JP | 2017059432 | 3/2017 |
| KR | 20100096008 | 9/2010 |

\* cited by examiner

ELECTROLYTE COMPOSITION AND RECHARGEABLE BATTERY

CROSS-REFERENCE TO RELATED APPLICATIONS

This application is a U.S. national phase application filed under 35 U.S.C. § 371 of International Application No. PCT/JP2018/021007, filed May 31, 2018, designating the United States, which claims priority from Japanese Patent Application No. 2017-109371, filed Jun. 1, 2017, which are hereby incorporated herein by reference in their entirety.

TECHNICAL FIELD

The present invention relates to electrolyte compositions and secondary batteries.

BACKGROUND ART

High performance secondary batteries have been required recently because mobile electronic devices, electric vehicles, and the like are spreading. Of these, lithium secondary batteries, which have a high energy density, have attracted attention as power sources such as batteries for electric vehicles, batteries for power storage. Specifically, lithium secondary batteries as batteries for electric vehicles are employed in electric vehicles such as a zero-emission electric vehicle having no engine mounted thereon, a hybrid electric vehicle having both an engine and a secondary battery mounted thereon, and a plug-in hybrid electric vehicle directly charged with electricity from a power system. Lithium secondary batteries as batteries for power storage are used in a stationary power storage system, which supplies electric power stored in advance in an emergency of interruption of a power system, and the like.

Lithium secondary batteries of a higher energy density have been desired for use in these wide applications, and development of such batteries is underway. Particularly, lithium secondary batteries for electric vehicles are required to have high safety in addition to high input and output characteristics and a high energy density, and thus, more sophisticated techniques for achieving the safety are required.

As methods for improving the safety of a lithium secondary battery, a method in which an electrolyte solution is flame-retarded by addition of a flame retardant thereto, a method in which an electrolyte solution is replaced by a polymer electrolyte or gel electrolyte, and the like have been conventionally known. Particularly, gel electrolytes have an ionic conductivity equivalent to electrolyte solutions used in conventional lithium secondary batteries. Thus, combustion of an electrolyte solution may be prevented by reducing the amount of the electrolyte solution to be liberated without degrading the battery performance, in accordance with the method in which an electrolyte solution is replaced by a gel electrolyte.

Patent Literature 1 discloses a gel-like electrolyte layer comprising a plasticizer comprising a lithium salt, a matrix polymer into which the plasticizer is dispersed, and fibrous insolubles. With respect to the fibrous insolubles, comprised in an amount of 0.1% by weight or more and 50% by weight or less in the gel-like electrolyte, the cycling characteristics and high-temperature storage characteristics of the battery are improved by setting the ratio of the fiber length to the fiber diameter to 10 or more and 3000 or less, the fiber length to 10 μm or more and 1 cm or less, and the fiber diameter to 0.05 μm or more and 50 μm or less.

Patent Literature 2 discloses a gel electrolyte and a gel electrolyte battery. The gel electrolyte layer is formed by swelling a matrix polymer with an electrolyte solution and comprises a large amount of a low viscous solvent of a low boiling point. By use of the gel electrolyte comprising a large amount of the low viscous solvent of a low boiling point, provided is a gel electrolyte battery excellent in temperature characteristics, current characteristics, capacity, and charging and discharging characteristics at a low temperature.

CITATION LIST

Patent Literature

Patent Literature 1: JP No. 2000-164254
Patent Literature 2: JP No. 2007-141467

SUMMARY OF INVENTION

Technical Problem

However, the electrical conductivity of conventional gel electrolytes as mentioned above are insufficient. For example, when these are employed as electrolytes in secondary batteries, the discharge characteristics of the secondary batteries may markedly deteriorate.

It is thus a major object of the present invention to provide an electrolyte composition enabling production of a secondary battery excellent in discharge characteristics.

Solution to Problem

A first aspect of the present invention is an electrolyte composition comprising one or two or more polymers, oxide particles having a hydrophobic surface, at least one electrolyte salt selected from the group consisting of a lithium salt, a sodium salt, a calcium salt, and a magnesium salt, and an ionic liquid.

The oxide particles are preferably surface-treated with a silicon-containing compound. The silicon-containing compound is preferably at least one selected from the group consisting of an alkoxy silane, an epoxy group-containing silane, an amino group-containing silane, a (meth)acryloyl group-containing silane, a silazane, and a siloxane.

The oxide particles are particles of at least one selected from the group consisting of $SiO_2$, $Al_2O_3$, AlOOH, MgO, CaO, $ZrO_2$, $TiO_2$, $Li_7La_3Zr_2O_{12}$; and $BaTiO_3$.

The ionic liquid preferably comprises, as a cationic component, at least one selected from the group consisting of a quaternary onium cation in a chain form, a piperidinium cation, a pyrrolidinium cation, a pyridinium cation, and an imidazolium cation.

The ionic liquid preferably comprises, as an anionic component, at least one of anionic components represented by the following formula (A):

$$N(SO_2C_mF_{2m+1})(SO_2C_nF_{2n+1})^- \quad (A)$$

where m and n each independently represent an integer of 0 to 5.

The polymer preferably has a first structural unit selected from the group consisting of a tetrafluoroethylene and a vinylidene fluoride.

The polymer preferably comprises the first structural unit and a second structural unit selected from the group consisting of a hexafluoropropylene, an acrylic acid, a maleic acid, an ethyl methacrylate, and a methyl methacrylate, in structural units constituting the polymer, The electrolyte salt is preferably an imide-based lithium salt, A second aspect of the present invention is a secondary battery comprising a positive electrode, a negative electrode, and an electrolyte layer constituted by an electrolyte composition provided between the positive electrode and the negative electrode.

Advantageous Effects of Invention

According to the present invention, it is possible to provide an electrolyte composition enabling production of a secondary battery excellent in discharge characteristics. According to the present invention, it is also possible to provide a secondary battery using such an electrolyte composition.

DESCRIPTION OF EMBODIMENTS

Hereinbelow, embodiments of the present invention will be described with reference to the drawings accordingly. However, the present invention is not intended to be limited to the following embodiments. In the following embodiments, their components (including steps) are not essential unless otherwise explicitly stated. Dimensions of the components in each drawing are imaginary, and the relative relationship of the dimension between the components is not limited to those shown in each drawing.

The numerical values and ranges thereof herein do not limit the present invention. Each numerical range specified using "to" herein represents a range including the numerical values indicated before and after "to" as the minimum value and the maximum value, respectively. In the numerical ranges described step-wisely herein, the upper limit or lower limit described in one numerical range may be replaced by the upper limit or lower limit of another stepwise description. Also in the numerical ranges described herein, the upper limit or lower limit of the numerical ranges may be replaced by a value shown in Examples.

First Embodiment

Figure 1:
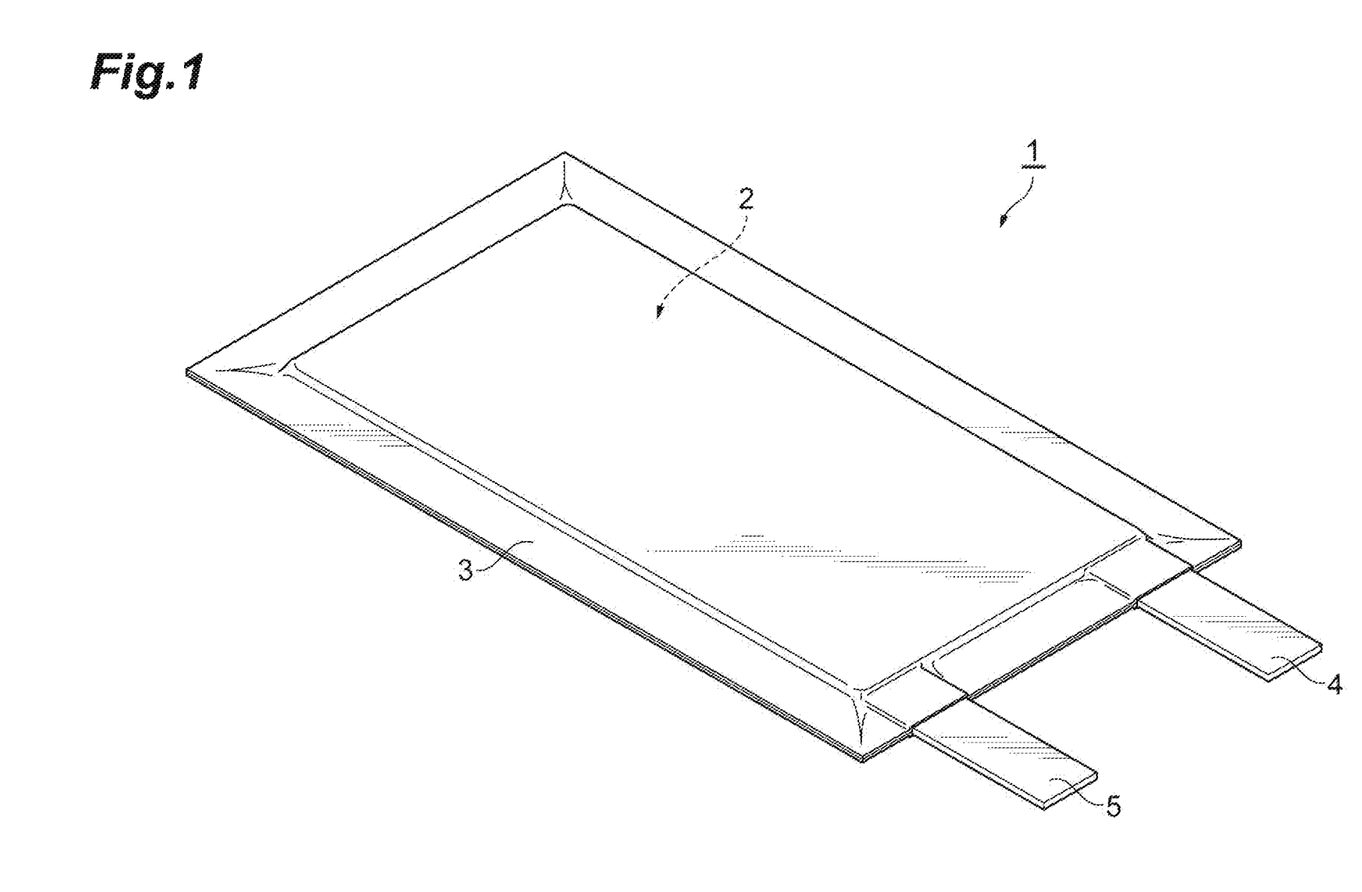
FIG. 1 is a perspective view showing a secondary battery according to First Embodiment.

FIG. 1 is a perspective view showing a secondary battery according to First Embodiment. As shown in FIG. 1, a secondary battery 1 comprises an electrode group 2 composed of a positive electrode, a negative electrode, and an electrolyte layer, and a bag-like battery outer packaging 3 to accommodate the electrode group 2. A positive electrode collector tab 4 on the positive electrode and a negative electrode collector tab 5 on the negative electrode are provided respectively. The positive electrode collector tab 4 and the negative electrode collector tab 5 protrude from the inside of the battery outer packaging 3 to the outside such that the positive electrode and the negative electrode can each electrically connect to the outside of the secondary battery 1.

The battery outer packaging 3 may be formed with a laminate film, for example. The laminate film may be a layered film in which, for example, a resin film such as a polyethylene terephthalate (PET) film, a foil of metal such as aluminum, copper, and stainless steel, and a sealant layer such as polypropylene are layered in this order.

Figure 2:
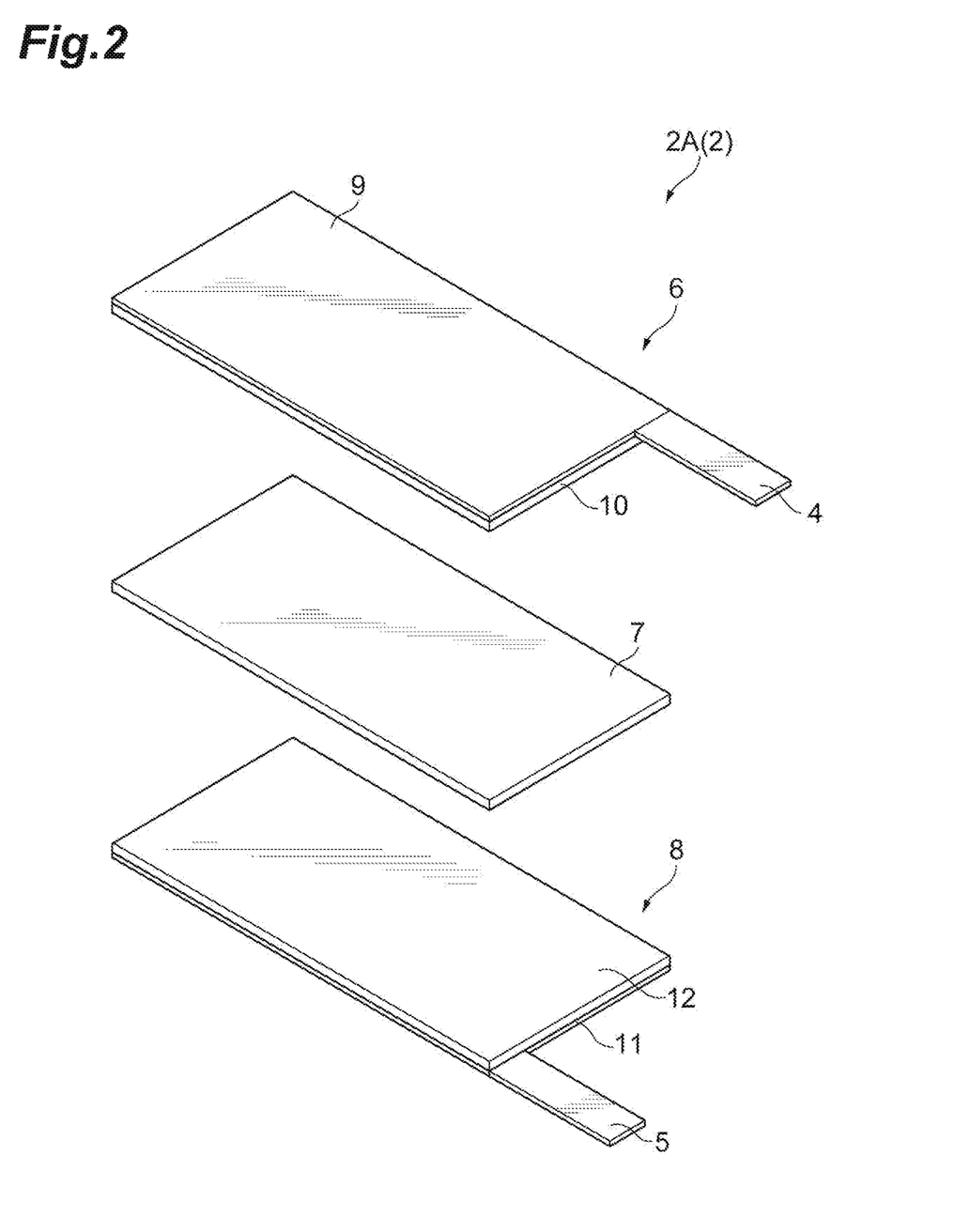
FIG. 2 is an exploded perspective view showing one embodiment of an electrode group in the secondary battery shown in FIG. 1.
Figure 3:
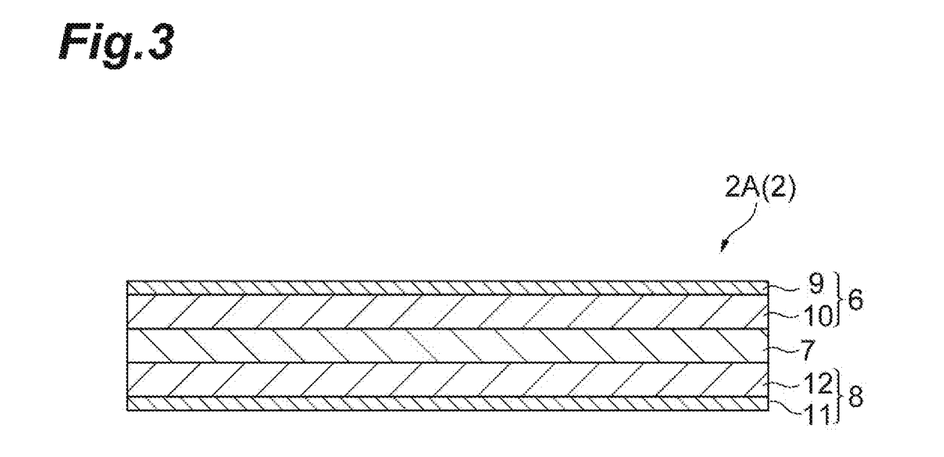
FIG. 3 is a schematic cross sectional view showing one embodiment of the electrode group in the secondary battery shown in FIG. 1.

FIG. 2 is an exploded perspective view showing one embodiment of an electrode group 2 in the secondary battery 1 shown in FIG. 1. FIG. 3 is a schematic cross sectional view showing one embodiment of the electrode group 2 in the secondary battery 1 shown in FIG. 1. As shown in FIG. 2 and FIG. 3, an electrode group 2A according to the present embodiment comprises a positive electrode 6, an electrolyte layer 7, and a negative electrode 8 in this order. The positive electrode 6 comprises a positive electrode current collector 9 and a positive electrode mixture layer 10 provided on the positive electrode current collector 9. On the positive electrode current collector 9, the positive electrode collector tab 4 is provided. The negative electrode 8 comprises a negative electrode current collector 11 and a negative electrode mixture layer 12 provided on the negative electrode current collector 11. On the negative electrode current collector 11, a negative electrode collector tab 5 is provided, The positive electrode current collector 9 may be formed with aluminum, stainless steel, titanium or the like. The positive electrode current collector 9 may be specifically, for example, an aluminum perforated foil having pores of which pore diameter is 0.1 to 10 µm, an expanded metal, a foamed metal sheet or the like. The positive electrode current collector 9 may be formed with any material other than those described above as long as the material is not subject to change such as dissolution and oxidation during use of the battery, and additionally, its shape and production method are not limited.

The thickness of the positive electrode current collector 9 may be 10 µm or more and 100 µm or less. From the viewpoint of reducing the total volume of the positive electrode, the thickness is preferably 10 µm or more and 50 µm or less, and from the viewpoint of winding the positive electrode at a small curvature on forming a battery, the thickness is more preferably 10 µm or more and 20 µm or less.

The positive electrode mixture layer 10, in one embodiment, comprises a positive electrode active material, a conductive agent, and a binding agent.

The positive electrode active material may be a lithium transition metal compound such as a lithium transition metal oxide and a lithium transition metal phosphate.

The lithium transition metal oxide may be, for example, lithium manganate, lithium nickelate, lithium cobaltate or the like. The lithium transition metal oxide may be a lithium transition metal oxide obtained by substituting a portion of the transition metal such as Mn, Ni, and Co comprised in lithium manganate, lithium nickelate, lithium cobaltate or the like with one or two or more other transition metals or metal elements (typical element) such as Mg and Al. That is, the lithium transition metal oxide may be a compound represented by $LiM^1O_2$ or $LiM^1O_4$ ($M^1$ includes at least one transition metal). The lithium transition metal oxide may be specifically $Li(Co_{1/3}Ni_{1/3}Mn_{1/3})O_2$, $LiNi_{1/2}Mn_{1/2}O_2$, $LiNi_{1/2}Mn_{3/2}O_4$ or the like.

The lithium transition metal oxide is preferably a compound represented by the following formula (1), from the viewpoint of further enhancing the energy density.

$$Li_aNi_bCo_cM^2_dO_{2+e} \qquad (1)$$

In the formula (1), $M^2$ is at least one selected from the group consisting of Al, Mn, Mg, and Ca, a, b, c, d, and e are numbers each satisfying $0.2 \le a \le 1.2$, $0.5 \le b \le 0.9$, $0.1 \le c \le 0.4$, $0 \le d \le 0.2$, $-0.2 \le e \le 0.2$ and $b+c+d=1$.

The lithium transition metal phosphate may be $LiFePO_4$, $LiMnPO_4$, $LiMn_xM^3_{1-x}PO_4$ ($0.3 \le x \le 1$, and $M^3$ is at least one element selected from the group consisting of Fe, Ni, Co Ti, Cu, Zn, Mg, and Zr) or the like.

The positive electrode active material may be ungranulated primary particles or granulated secondary particles.

The particle size of the positive electrode active material is adjusted to be equal to or smaller than the thickness of the positive electrode mixture layer 10. In the case where coarse particles having a particle size equal to or larger than the thickness of positive electrode mixture layer 10 are present in the positive electrode active material, the coarse particles are removed by sieve classification, wind flow classification or the like in advance to select positive electrode active material having a particle size equal to or smaller than the thickness of the positive electrode mixture layer 10.

The average particle size of the positive electrode active material is preferably 0.1 μm or more, more preferably 1 μm or more and preferably 30 μm or less, more preferably 25 μm or less. The average particle size of the positive electrode active material is the particle size ($D_{50}$) when the ratio based on the total volume of the positive electrode active material (volume fraction) is 50%. The average particle size of the positive electrode active material ($D_{50}$) is obtained by measuring a suspension, prepared by suspending the positive electrode active material in water, by the laser scattering method using a laser scattering type particle size measuring apparatus (e.g., Microtrac).

The content of the positive electrode active material may be 70% by mass or more, 80% by mass or more, or 85% by mass or more based on the total amount of the positive electrode mixture layer. The content of the positive electrode active material may be 95% by mass or less, 92% by mass or less, or 90% by mass or less based on the total amount of the positive electrode mixture layer.

The conductive agent may be a carbon material such as graphite, acetylene black, carbon black, carbon fibers, or carbon nanotubes, although not particularly limited. The conductive agent may be a mixture of two or more of the carbon materials mentioned above.

The content of conductive agent may be 0.1% by mass or more, 1% by mass or more, or 3% by mass or more based on the total amount of the positive electrode mixture layer. The content of the conductive agent is preferably 15% by mass or less, more preferably 10% by mass or less, further preferably 8% by mass or less based on the total amount of the positive electrode mixture layer, from the viewpoint of suppressing increase in the volume of the positive electrode 6 and reduction in the energy density of the secondary battery 1 associated with the increase.

The binding agent is not limited as long as the binding agent does not decompose on the surface of the positive electrode 6, and may be a polymer comprising at least one selected from the group consisting of tetrafluoroethylene, vinylidene fluoride, hexafluoropropylene, acrylic acid, maleic acid, ethyl methacrylate, and methyl methacrylate as a monomer unit or a rubber such as styrene-butadiene rubber, isoprene rubber, and acrylic rubber. The binding agent is a copolymer preferably comprising tetrafluoroethylene and vinylidene fluoride as structural units.

The content of the binding agent may be 0.5% by mass or more, 1% by mass or more, or 3% by mass or more based on the total amount of the positive electrode mixture layer. The content of the binding agent may be 20% by mass or less, 15% by mass or less, or 10% by mass or less based on the total amount of the positive electrode mixture layer.

The positive electrode mixture layer 10 may further comprise an ionic liquid.

As the ionic liquid, an ionic liquid to be used in an electrolyte composition mentioned below can be used. The content of the ionic liquid comprised in the positive electrode mixture layer 10 is preferably 3% by mass or more, more preferably 5% by mass or more, further preferably 10% by mass or more based on the total amount of the positive electrode mixture layer. The content of the ionic liquid comprised in the positive electrode mixture layer 10 is preferably 30% by mass or less, more preferably 25% by mass or less, further preferably 20% by mass or less based on the total amount of the positive electrode mixture layer.

An electrolyte salt may be dissolved in the ionic liquid comprised in the positive electrode mixture layer 10. As the electrolyte salt, an electrolyte salt to be used in an electrolyte composition mentioned below may be used.

The thickness of the positive electrode mixture layer 10 is a thickness equal to or larger than the average particle size of the positive electrode active material, from the viewpoint of further enhancing the electrical conductivity, and specifically may be 10 μm or more, 15 μm or more, or 20 μm or more. The thickness of the positive electrode mixture layer 10 may be 100 μm or less, 80 μm or less, or 70 μm or less. By setting the thickness of the positive electrode mixture layer to 100 μm or less, it is possible to suppress an imbalance of charge and discharge caused by variation of the charged level of the positive electrode active material in the proximity of the surface of the positive electrode mixture layer 10 and in the proximity of the surface of the positive electrode current collector 9.

The negative electrode current collector 11 may be a metal such as aluminum, copper, nickel, and stainless, or an alloy thereof. The negative electrode current collector 11 is preferably an aluminum or alloy thereof because of being light-weighted and having a high energy density per weight. The negative electrode current collector 11 is preferably copper, from the viewpoint of its ease of processing into a thin film and costs.

The thickness of the negative electrode current collector 11 may be 10 μm or more and 100 μm or less. From the viewpoint of reducing the total volume of the negative electrode, the thickness is preferably 10 μm or more and 50 μm or less, and from the viewpoint of winding the negative electrode at a small curvature on forming a battery, the thickness is more preferably 10 μm or more and 20 μm or less.

The negative electrode mixture layer 12, in one embodiment, comprises a negative electrode active material and a binding agent.

As the negative electrode active material, ones commonly used in the field of energy devices can be used. Specific examples of the negative electrode active material include metal lithium, lithium titanate ($Li_4Ti_5O_{12}$), lithium alloys or other metal compounds, carbon materials, metal complexes, and organic polymer compounds. The negative electrode active material may be singly one of these or a mixture of two or more of these. Examples of the carbon materials include graphite such as natural graphite (such as scale-like graphite) and artificial graphite, amorphous carbon, carbon fibers, and carbon black such as acetylene black, Ketjen black, channel black, furnace black, lamp black, and thermal black. The negative electrode active material may be silicon, tin, or a compound comprising these elements (an oxide, a nitride, or an alloy with other metal), from the viewpoint of obtaining a larger theoretical capacity (e.g., 500 to 1500 Ah/kg).

The average particle size of the negative electrode active material ($D_{50}$, is preferably 1 μm or more, more preferably 5 μm or more, further preferably 10 μm or more, and preferably 50 μm or less, more preferably 40 μm or less, further preferably 30 μm or less, from the viewpoint of suppressing increase in the irreversible capacity associated with reduction in the particle size as well as of obtaining a well-balanced negative electrode in which retention capability of an electrolyte salt is enhanced. The average particle size of the negative electrode active material ($D_{50}$) is measured by the same method as for the average particle size of the positive electrode active material mentioned above ($D_{50}$).

The content of the negative electrode active material may be 60% by mass or more, 65% by mass or more, or 70% by mass or more based on the total amount of the negative electrode mixture layer. The content of the negative electrode active material may be 99% by mass or less, 95% by mass or less, or 90% by mass or less based on the total amount of the negative electrode mixture layer.

The binding agent and its content may be the same as the binding agent and its content in the positive electrode mixture layer 10 mentioned above.

The negative electrode mixture layer 12 may further comprise a conductive agent, from the viewpoint of further reducing the resistance of the negative electrode 8. The conductive agent and its content may be the same as the conductive agent and its content in the positive electrode mixture layer 10 mentioned above.

The negative electrode mixture layer 12 may further comprise an ionic liquid.

As the ionic liquid, an ionic liquid to be used in an electrolyte composition mentioned below can be used. The content of the ionic liquid comprised in the negative electrode mixture layer 12 is preferably 3% by mass or more, more preferably 5% by mass or more, further preferably 10% by mass or more based on the total amount of the negative electrode mixture layer. The content of the ionic liquid comprised in the negative electrode mixture layer 12 is preferably 30% by mass or less, more preferably 25% by mass or less, further preferably 20% by mass or less based on the total amount of the negative electrode mixture layer.

An electrolyte salt similar to an electrolyte salt that can be used in the positive electrode mixture layer 10 mentioned above may be dissolved in the ionic liquid comprised in the negative electrode mixture layer 12.

The thickness of the negative electrode mixture layer 12 may be 10 μm or more, 15 μm or more, or 20 μm or more. The thickness of the negative electrode mixture layer 12 may be 100 μm or less, 80 μm or less, or 70 μm or less.

The electrolyte layer 7 is formed by producing an electrolyte sheet using an electrolyte composition, for example. The electrolyte composition comprises one or two or more polymers, oxide particles, at least one electrolyte salt selected from the group consisting of a lithium salt, a sodium salt, a calcium salt, and a magnesium salt, and an ionic liquid.

The polymer preferably has a first structural unit selected from the group consisting of a tetrafluoroethylene and a vinylidene fluoride, The first structural unit and a second structural unit selected from the group consisting of a hexafluoropropylene, an acrylic acid, maleic acid, an ethyl methacrylate, and a methyl methacrylate may be comprised in structural units constituting the polymer. That is, the first structural unit and the second structural unit may be comprised in one type of polymer to constitute a copolymer, or may be each comprised in different polymers to constitute at least two types of polymers: a first polymer having the first structural unit and a second polymer having the second structural unit.

The polymer may be specifically a polytetrafluoroethylene, a polyvinylidene fluoride, a copolymer of vinylidene fluoride and hexafluoropropylene or the like.

The content of the polymer is preferably 3% by mass or more based on the total amount of the electrolyte composition (electrolyte layer). The content of the polymer is preferably 50% by mass or less, more preferably 40% by mass or less based on the total amount of the electrolyte composition. The content of the polymer is preferably 3 to 50% by mass or 3 to 40% by mass based on the total amount of the electrolyte composition.

The polymer according to the present embodiment, which is excellent in the affinity for the ionic liquid comprised in the electrolyte composition, maintains the electrolyte in the ionic liquid. For this reason, liquid leakage of the ionic liquid is suppressed when a load is applied to the electrolyte composition.

The oxide particles may be, for example, particles of an inorganic oxide. The inorganic oxide may be an inorganic oxide comprising, for example, Li, Mg, Al, Si, Ca, Ti, Zr, La, Na, K, Ba, Sr, V, Nb, B, Ge or the like, as the constituent element. The oxide particles are preferably particles of at least one selected from the group consisting of $SiO_2$, $Al_2O_3$, AlOOH, MgO, CaO, $ZrO_2$, $TiO_2$, $Li_7La_3Zr_2O_{12}$, and $BaTiO_3$. The oxide particles can facilitate dissociation of the electrolyte in the electrolyte layer 7 to thereby improve the battery characteristics because the oxide particles have a polarity.

The oxide particles have a hydrophobic surface. The oxide particles usually have hydroxyl groups on the surface and tend to exhibit hydrophilicity. In oxide particles having a hydrophobic surface, hydroxyl groups on the surface are reduced in comparison with oxide particles having no hydrophobic surface. For this reason, when oxide particles having a hydrophobic surface are used, the ionic liquid (e.g., ionic liquid in which an anionic component has $N(SO_2F)_2^-$, $N(SO_2CF_3)_2^-$ or the like) comprised in the electrolyte composition is hydrophobic, and thus, the affinity between these oxide particles and the ionic liquid is expected to be improved. Thus, the liquid retentivity of the ionic liquid in the electrolyte layer is furthermore improved, and as the result, it is conceived that the ionic conductivity is further improved.

The oxide particles having a hydrophobic surface can be obtained by, for example, treating oxide particles exhibiting hydrophilicity with a surface treatment agent capable of imparting a hydrophobic surface. That is, the oxide particles having a hydrophobic surface may be oxide particles surface-treated with a surface treatment agent capable of imparting a hydrophobic surface. Examples of the surface treatment agent include silicon-containing compounds.

The oxide particles having a hydrophobic surface may be oxide particles surface-treated with a silicon-containing compound. That is, in the oxide particles having a hydrophobic surface, the surface of the oxide particles may be bonded to the silicon atoms of the silicon-containing compound via oxygen atoms. The silicon-containing compound as the surface treatment agent is preferably at least one selected from the group consisting of an alkoxysilane, an epoxy group-containing silane, an amino group-containing slime, a (meth)acryloyl group-containing silane, a silazane, and a siloxane.

The alkoxysilane may be methyltrimethoxysilane, dimethyldimethoxysilane, phenyltrimethoxysilane, phenyltriethoxysilane, dimethoxydiphenylsilane, n-propyltrimethoxysilane, hexyltrimethoxysilane, tetraetlioxysilane, methyltriethoxysilane, dimethyldiethoxysilane, n-propyltriethoxysilane or the like.

The epoxy group-containing silane may be
2-(3,4-epoxycyclohexyl)ethyltrimethoxysilane,
3-glycidoxypropylmethyldimethoxysilane,
3-glycidoxypropyltrimethoxysilane,
3-glycidoxypropylmethyldiethoxysilane,
3-glycidoxypropyltriethoxysilane or the like.

The amino group-containing silane may be
N-2-(aminoethyl)-3-aminopropylmethyldimethoxysilane,
N-2-(aminoethyl)-3-aminopropyltrimethoxysilane,
3-aminopropyltriethoxysilane,
N-phenyl-3-aminopropyitrimethoxysilane or the like.

The (meth)acryloyl group-containing silane may be
3-methacryloyloxypropylmethyldimethoxysilane,
3-methacryloyloxypropyltrimethoxysilane,
3-methacryloyloxypropylmethyldiethoxysilane,
3-methacryloyloxypropyltriethoxysilane,
3-acryloyloxypropyltrimethoxysilane or the like. It should be noted that the (meth)acryloyl group herein means an acryloyl group or the corresponding methacryloyl group.

The silazane may be hexamethyldisilazane or the like.

The siloxane may be silicone oil such as dimethylsiloxarte. The siloxane may be one having a reactive functional group (e.g., carboxyl group or the like) at one terminal or both terminals thereof.

As the oxide particles having a hydrophobic surface (surface-treated oxide particles), those produced by a known method may be used or a commercially available product may be used as it is.

The oxide particles generally may include primary particles (particles not constituting secondary particles), which each form integrally a single particle, as judged from their apparent geometry, and secondary particles, which are formed by assembling a plurality of primary particles.

The specific surface area of the oxide particles may be 2 to 380 m$^2$/g, for example. When the specific surface area is 2 to 380 m$^2$/g, a secondary battery to be obtained tends to be excellent in discharge characteristics. From the similar viewpoint, the specific surface area of the oxide particles may be 5 m$^2$/g or more, 10 m$^2$/g or more, 15 m$^2$/g or more, 20 m$^2$/g or more, or 30 m$^2$/g or more. From the viewpoint of ease of peeling of the electrolyte sheet from the substrate of the electrolyte layer, the specific surface area of the oxide particles may be 350 m$^2$/g or less, 300 m$^2$/g or less, 250 m$^2$/g or less, 200 m$^2$/g or less, 180 m$^2$/g or less, 150 m$^2$/g or less, 130 m$^2$/g or less, 100 m$^2$/g or less, 80 m$^2$/g or less, or 60 m$^2$/g or less. The specific surface area of the oxide particles means the specific surface area of the entire oxide particles including the primary particles and secondary particles and is measured, by the BET method.

The average primary particle size of the oxide particles (average particle size of the primary particles) is preferably 0.005 µm (5 nm) or more, more preferably 0.01 µm (10 nm) or more, further preferably 0.015 µm. (15 nm) or more, from the viewpoint of further improving the electrical conductivity. The average primary particle size of the oxide particles is preferably 1 µm or less, more preferably 0.1 µm or less, further preferably 0.05 µm or less, from the viewpoint of making the electrolyte layer 7 thinner The average primary particle size of the oxide particles is preferably 0.005 to 1 µm, 0.01 to 0.1 µm, or 0.015 to 0.05 µm, from the viewpoint of forming the electrolyte composition into a thin layer and from the viewpoint of preventing protrusion of the oxide particles from the electrolyte composition surface. The average primary particle size of the oxide particles can be measured by observing the oxide particles by use of a transmission electron microscope or the like.

The average particle size of the oxide particles is preferably 0.005 µm or more, more preferably 0.01 µm or more, further preferably 0.03 µm or more. The average particle size of the oxide particles is preferably 5 µm or less, more preferably 3 µm or less, further preferably or less. The average particle size of the oxide particles is measured by a laser diffraction method and corresponds to the particle size at which the cumulative volume is 50% in the case where a volume cumulative particle size distribution curve is drawn from the side of the smaller particle size.

The shape of the oxide particles may be massive or substantially spherical, for example. The aspect ratio of the oxide particles is preferably 1.0 or less, more preferably 5 or less, further preferably 2 or less, from the viewpoint of easily making the electrolyte layer 7 thinner. The aspect ratio is defined as a ratio between the length of a particle in the major axis direction (maximum length of the particle) and the length of the particle in the minor axis direction (minimum length of the particle), calculated from a scanning electron microphotograph of the oxide particle. The length of the particle can be determined by statistical calculation on the micrograph using commercially available image processing software (e.g., image analysis software, A-zoh-kun (R) manufactured by Asahi Kasei Engineering Corporation).

The content of the oxide particles is preferably 5% by mass or more, more preferably 10% by mass or more, further preferably 15% by mass or more, particularly preferably 20% by mass or more and preferably 60% by mass or less, more preferably 50% by mass or less, further preferably 40% by mass or less based on the total amount of the electrolyte composition (electrolyte layer).

The electrolyte salt is at least one selected from the group consisting of a lithium salt, a sodium salt, a calcium salt, and a magnesium salt. The electrolyte salt is a compound to be used for donation and acceptance of cations between the positive electrode 6 and the negative electrode 8. The above-described electrolyte salt has a low degree of dissociation at a low temperature, easily diffuses in the ionic liquid, and in addition, is not thermally decomposed at a high temperature. Thus, the electrolyte salt is preferred in respect that the range of the ambient temperature in which secondary battery can be used is widened. The electrolyte salt may be an electrolyte salt used in fluoride ion batteries.

The anionic component of the electrolyte salt may be a halide ion (I$^-$, Cl$^-$, Br$^-$ or the like), SCN$^-$, BF$_4^-$, BF$_3$(CF$_3$)$^-$, BF$_3$(C$_2$F$_5$)$^-$, ClO$_4^-$, SbF$_6^-$, N(SO$_2$F)$_2^-$, N(SO$_2$CF$_3$)$_2^-$, N(SO$_2$C$_2$F$_5$)$_2^-$, B(C$_6$H$_5$)$_4^-$, B(O$_2$C$_2$H$_4$)$_2^-$, C(SO$_2$F)$_3^-$, C(SO$_2$CF$_3$)$_3^-$, CF$_3$COO$^-$, CF$_3$SO$_2$O$^-$, C$_6$F$_5$SO$_2$O$^-$, B(O$_2$C$_2$O$_2$)$_2^-$ or the like. The anionic component of the electrolyte salt is preferably an anionic component represented by the formula (A), which is illustrated in the anionic component of the ionic liquid mentioned below such as $N(SO_2F)_2^-$ and $N(SO_2CF_3)_2^-$, $PF_6^-$, $BF_4^-$, $B(O_2C_2O_2)_2^-$, or $ClO_4^-$.

It should be noted that, as abbreviations, the following may be used.

[FSI]$^-$: $N(SO_2F)_2^-$, bis(fluorosulfonyl)imide anion
[TFSI]$^-$: $N(SO_2CF_3)_2^-$, bis(trifluoromethanesulfonyl)imide anion
[BOB]$^-$: $B(O_2C_2O_2)_2^-$, bis oxalate borate anion
[f3C]$^-$: $C(SO_2F)_3^-$, tris(fluorosulfonyl)carbanion The lithium salt may be at least one selected from the group consisting of $LiPF_6$, $LiBF_4$, Li[FSI], Li[TFSI], Li[f3C], Li[BOB], $LiClO_4$, $LiBF_3(CF_3)$, $LiBF_3(C_2F_5)$, $LiBF_3(C_3F_7)$, $LiBF_3(C_4F_9)$, $LiC(SO_2CF_3)_3$, $CF_3SO_2OLi$, $CF_3COOLi$, and RCOOLi (R is an alkyl group having 1 to 4 carbon atoms, a phenyl group, or a naphthyl group).

The sodium salt may be at least one selected from the group consisting of $NaPF_6$, $NaBF_4$, Na[FSI], Na[TFSI], Na[f3C], Na[BOB], $NaClO_4$, $NaBF_3(CF_3)$, $NaBF_3(C_2F_5)$, $NaBF_3(C_3F_7)$, $NaBF_3(C_4F_9)$, $NaC(SO_2CF_3)_3$, $CF_3SO_2ONa$, $CF_3COONa$, and RCOONa (R is an alkyl group having 1 to 4 carbon atoms, a phenyl group, or a naphthyl group).

The calcium salt may be at least one selected from the group consisting of $Ca(PF_6)_2$, $Ca(BF_4)_2$, $Ca[FSI]_2$, $Ca[TFSI]_2$, $Ca[f3C]_2$, $Ca[BOB]_2$, $Ca(ClO_4)_2$, $Ca[BF_3(CF_3)]_2$, $Ca[BF_3(C_2F_5)]_2$, $Ca[BF_3(C_3F_7)]_2$, $Ca[BF_3(C_4F_9)]_2$, $Ca[C(SO_2CF_3)_3]_2$, $(CF_3SO_2O)_2Ca$, $(CF_3COO)_2Ca$, and $(RCOO)_2Ca$ (R is an alkyl group having 1 to 4 carbon atoms, a phenyl group, or a naphthyl group).

The magnesium salt may be at least one selected from the group consisting of $Mg(PF_6)_2$, $Mg(BF_4)_2$, $Mg[FSI]_2$, $Mg[TFSI]_2$, $Mg[f3C]_2$, $Mg[BOB]_2$, $Na(ClO_4)_2$, $Mg[BF_3(CF_3)]_2$, $Mg[BF_3(C_2F_5)]_2$, $Mg[BF_3(C_3F_7)]_2$, $Mg[BF_3(C_4F_9)]_2$, $Mg[C(SO_2CF_3)_3]_2$, $(CF_3SO_3)_2Mg$, $(CF_3COO)_2Mg$, and $(RCOO)_2Mg$ (R is an alkyl group having 1 to 4 carbon atoms, a phenyl group, or a naphthyl group).

The electrolyte salt is preferably one selected from the group consisting of an imide-based lithium salt, an imide-based sodium salt, an imide-based calcium salt, and an imide-based magnesium salt, more preferably an imide-based lithium salt.

The imide-based lithium salt may be Li[TFSI], Li[FSI] or the like. The imide-based sodium salt may be Na[TFSI], Na[FSI] or the like. The imide-based calcium salt may be $Ca[TFSI]_2$, $Ca[FSI]_2$ or the like. The imide-based magnesium salt may be $Mg[TFSI]_2$, $Mg[FSI]_2$ or the like.

The ionic liquid comprises the following anionic component and cationic component. It should be noted that the ionic liquid in the present embodiment is a substance that is liquid at $-20°$ C. or more.

The anionic component of the ionic liquid is not particularly limited and may be an anion of a halogen such as $Cl^-$, $Br^-$, and $I^-$, an inorganic anion such as $BF_4^-$ and $N(SO_2F)_2^-$, an organic anion such as $B(C_6H_5)_4^-$, $CH_3SO_2^-$, $CF_3SO_2O^-$, $N(SO_2C_4F_9)_2^-$, $N(SO_2CF_3)_2^-$, and $N(SO_2C_2F_5)_2^-$ or the like.

The anionic component of the ionic liquid preferably comprises at least one of anionic components represented by the following formula (A).

$$N(SO_2C_mF_{2m+1})(SO_2C_nF_{2n+1})^- \qquad (A)$$

m and n each independently represent an integer of 0 to 5. m and n may be the same or different from each other and are preferably the same each other.

The anionic component represented by the formula (A) may be, for example, $N(SO_2C_4F_9)_2^-$, $N(SO_2F)_2^-$, $N(SO_2CF_3)_2^-$, or $N(SO_2C_2F_5)_2^-$.

The anionic component of the ionic liquid comprises more preferably at least one selected from the group consisting of $N(SO_2C_4F_9)_2^-$, $CF_3SO_2O^-$, $N(SO_2F)_2^-$, $N(SO_2CF_3)_2^-$, and $N(SO_2C_2F_5)_2^-$ and further preferably $N(SO_2F)_2^-$, from the viewpoint of further improving the ionic conductivity at a relatively low viscosity as well as further improving the charge and discharge characteristics.

The cationic component of the ionic liquid is not particularly limited and is preferably at least one selected from the group consisting of a quaternary onium cation in a chain form, a piperidinium cation, a pyrrolidinium cation, a pyridinium cation, and an imidazolium cation, The quaternary onium cation in chain form is, for example, a compound represented by the following formula (2).

(2)

In the formula (2), $R^1$ to $R^4$ each independently represent a alkyl group in chain form having 1 to 20 carbon atoms or a alkoxyalkyl group in chain form represented by R—O—$(CH_2)_n$— (R represents a methyl group or an ethyl group, and n represents an integer of 1 to 4), and X represents a nitrogen atom or a phosphorous atom. The number of carbon atoms of the alkyl group represented by $R^1$ to $R^4$ is preferably 1 to 20, more preferably 1 to 10, further preferably 1 to 5.

The piperidinium cation is, for example, a nitrogen-containing six-membered cyclic compound represented by the following formula (3).

(3)

In the formula (3), $R^5$ and $R^6$ each independently represent an alkyl group having 1 to 20 carbon atoms or an alkoxyalkyl group represented by R—O—$(CH_2)_n$— (R represents a methyl group or an ethyl group, and n represents an integer of 1 to 4). The number of carbon atoms of the alkyl group represented by $R^5$ and $R^6$ is preferably 1 to 20, more preferably 1 to 10, further preferably 1 to 5.

The pynolidinium cation is, for example, a five-membered cyclic compound represented by the following formula (4).

(4)

In the formula (4), R7 and $R^8$ each independently represent an alkyl group having 1 to 20 carbon atoms or an alkoxyalkyl group represented by R—O—$(CH_2)_n$— (R represents a methyl group or an ethyl group, and mm represents an integer of 1 to 4). The number of carbon atoms of the alkyl group represented by $R^7$ and $R^8$ is preferably 1 to 20, more preferably 1 to 10, further preferably 1 to 5.

The pyridinium cation is, for example, a compound represented by the formula (5).

(5)

In the formula (5), $R^9$ to $R^{13}$ each independently represent an alkyl group having 1 to 20 carbon atoms, an alkoxyalkyl group represented by $R$—$O$—$(CH_2)_n$— (R represents a methyl group or an ethyl group, and n represents an integer of 1 to 4), or a hydrogen atom. The number of carbon atoms of the alkyl group represented by $R^9$ to $R^{13}$ is preferably 1 to 20, more preferably 1 to 10, further preferably 1 to 5.

The imidazolium cation is, for example, a compound represented by the following formula. (6).

(6)

In the formula (6), $R^{14}$ to $R^{18}$ each independently represent an alkyl group having 1 to 20 carbon atoms, an alkoxyalkyl group represented by $R$—$O$—$(CH_2)_n$— (R represents a methyl group or an ethyl group, and n represents an integer of 1 to 4), or a hydrogen atom. The number of carbon atoms of the alkyl group represented by $R^{14}$ to $R^{18}$ is preferably 1 to 20, more preferably 1 to 10, further preferably 1 to 5.

The total content of the electrolyte salt and the ionic liquid (the ionic liquid in which the electrolyte salt was dissolved) may be 10% by mass or more, may be 80% by mass or less based on the total amount of the electrolyte composition (electrolyte layer), from the viewpoint of suitably producing the electrolyte layer. The content of the ionic liquid is preferably 20% by mass or more, more preferably 30% by mass or more based on the total amount of the electrolyte composition, from the viewpoint of enabling charge and discharge of the lithium secondary battery at a high load factor.

The molar concentration of the ionic liquid in which the electrolyte salt was dissolved (amount of substance of the electrolyte salt per unit volume of the ionic liquid) is preferably 0.5 mol/L or more, more preferably 0.7 mol/L or more, further preferably 1.0 mol/L or more, preferably 2.0 mol/L or less, more preferably 1.8 mol/L or less, further preferably 1.6 mol/L, or less, from the viewpoint of further improving the charge and discharge characteristics.

The thickness of the electrolyte layer 7 is preferably 5 μm or more, more preferably 10 μm or more, from the viewpoint of improving the electrical conductivity and improving the strength. The thickness of the electrolyte layer 7 is preferably 200 μm or less, more preferably 150 μm or less, further preferably 100 μm or less, particularly preferably 50 μm or less, from the viewpoint of suppressing the resistance of the electrolyte layer 7.

Subsequently, a method for producing the secondary battery 1 mentioned above will be described. The method for producing the secondary battery 1 according to the present embodiment comprises a first step of forming the positive electrode mixture layer 10 on the positive electrode current collector 9 to obtain the positive electrode 6, a second step of forming the negative electrode mixture layer 12 on the negative electrode current collector 11 to obtain the negative electrode 8, and a third step of providing the electrolyte layer 7 between the positive electrode 6 and the negative electrode 8.

In the first step, the positive electrode 6 is obtained by, for example, dispersing materials used for the positive electrode mixture layer in a dispersion medium using a kneading machine, a disperser or the like to obtain a slurried positive electrode mixture, then applying this positive electrode mixture by a doctor blade method, a dipping method, a spray method or the like on the positive electrode current collector 9, and then vaporizing the dispersion medium. After the dispersion medium is vaporized, a compression molding step by a roll press may be provided as required. The positive electrode mixture layer 10 may be formed as a positive electrode mixture layer of a multi-layer structure by performing the aforementioned steps from application of the positive electrode mixture to vaporization of the dispersion medium a plurality of times.

The dispersion medium to be used in the first step may be water, 1-methyl-2-pyrrolidone (hereinbelow, also referred to as NMP) or the like. It should be noted that the dispersion medium is a compound other than the aforementioned ionic liquid.

In the second step, the method for forming the negative electrode mixture layer 12 on the negative electrode current collector 11 may be a method similar to the first step mentioned above.

In the third step, in one embodiment, the electrolyte layer 7 is formed by producing an electrolyte sheet using the electrolyte composition. FIG. 4(a) is a schematic cross sectional view showing an electrolyte sheet according to one embodiment. As shown in FIG. 4(a), the electrolyte sheet 13A comprises a substrate 14 and an electrolyte layer 7 provided on the substrate 14.

The electrolyte sheet 13A is produced by; for example, dispersing a material to be used for the electrolyte layer 7 in a dispersion medium to obtain a slurry, then applying the slurry on the substrate 14, and then vaporizing the dispersion medium. The dispersion medium is preferably water, NMP, toluene or the like.

The substrate 14 is a substrate having heat resistance that may tolerate heating when the dispersion medium is vaporized, is not limited as long as the substrate does not react with the electrolyte composition, and is not swelled with the electrolyte composition. The substrate may be formed by a resin, for example. The substrate 14 may be specifically a film composed of a resin such as polyethylene terephthalate, polytetrafluoroethylene, polyimide, polyethersulfone, polyetherketone (general-purpose engineering plastic).

The substrate 14 is only required to have a heat resistant temperature durable to the temperature of the treatment of vaporizing the dispersion medium in the course of production of the electrolyte layer. The heat resistant temperature is the softening point (temperature at which plastic deformation begins) or the melting point of the substrate 14, whichever is lower, when the substrate 14 is formed by a resin. The heat resistant temperature of the substrate 14 is preferably 50° C. or more, more preferably 100° C. or more, further preferably 150° C. or more, and may be, for example, 400° C. or less, from the viewpoint of adaptability with the ionic liquid to be used in the electrolyte layer 7. When a substrate having the above-described heat resistant temperature is used, it is possible to suitably use the dispersion medium as mentioned above (NMP, toluene or the like).

It is preferred that the thickness of the substrate 14 be as small as possible while the strength to tolerate the tensile strength in an applicator is maintained. The thickness of the substrate 14 is preferably 5 µm or more, more preferably 10 µm or more, further preferably 25 µm or more and preferably 100 µm or less, more preferably 50 µm or less, further preferably 40 µm or less, from the viewpoint of reducing the entire volume of the electrolyte sheet 13A as well as of retaining the strength when the electrolyte composition is applied to the substrate 14.

Figure 4:
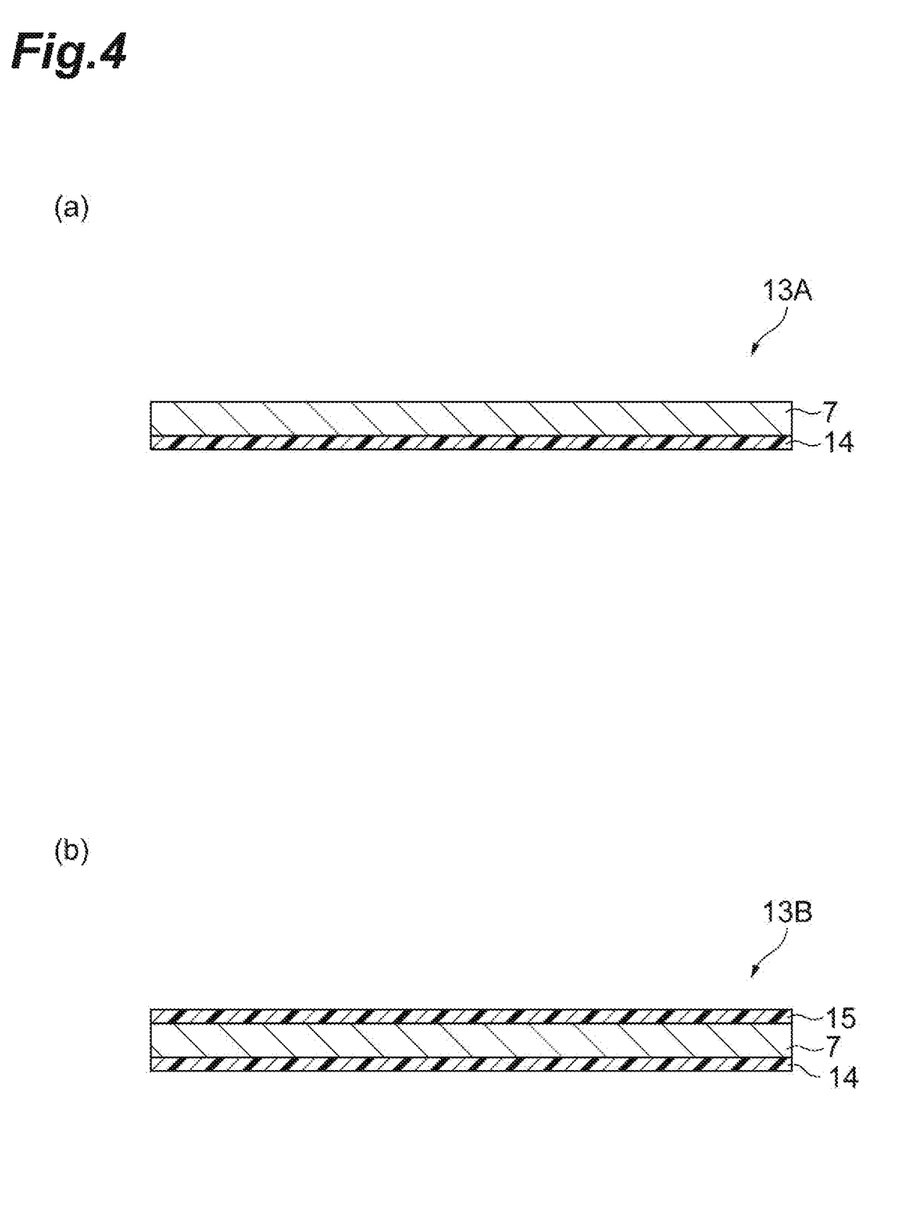
FIG. 4(a) is a schematic cross sectional view showing an electrolyte sheet according to one embodiment.
FIG. 4(b) is a schematic cross sectional view showing an electrolyte sheet according to another embodiment.

It is possible to produce an electrolyte sheet continuously while winding the sheet into a roll form. In this case, the surface of the electrolyte layer 7 comes in contact with the back surface of the substrate 14, a portion of the electrolyte layer 7 sticks to the substrate 14, and thus the electrolyte layer 7 may be broken. In order to prevent such a situation, the electrolyte sheet, as another embodiment, may also be one in which a protective material is provided on the side of the electrolyte layer 7 opposite to the substrate 14. FIG. 4(*b*) is a schematic cross sectional view showing an electrolyte sheet according to another embodiment. As shown in FIG. 4(*b*), the electrolyte sheet 13B is further provided with a protective material 15 on the side of the electrolyte layer 7 opposite to the substrate 14.

The protective material 15 may be one that is easily peelable from the electrolyte layer 7, and is preferably an apolar resin film such as polyethylene and polypropylene, polytetrafluoroethylene. When an apolar resin film is used, the electrolyte layer 7 and the protective material 15 do not stick to each other, and it is possible to easily peel the protective material 15 off.

The thickness of the protective material 15 is preferably 5 µm or more, more preferably 10 µm or more, and preferably 100 µm or less, more preferably 50 µm or less, further preferably 30 µm or less, from the viewpoint of reducing the entire volume of the electrolyte sheet 13B as well as of retaining the strength.

The heat resistant temperature of the protective material 15 is preferably −30° C. or more, more preferably 0° C. or more and preferably 100° C. or less, more preferably 50° C. or less, from the viewpoint of suppressing deterioration under low-temperature environments as well as suppressing softening under high-temperature environments. When the protective material 15 is provided, vaporizing the dispersion medium aforementioned is not essential, and thus it is not necessary to making the heat resistant temperature higher.

In the method in which the electrolyte layer 7 is provided between the positive electrode 6 and the negative electrode 8 by using the electrolyte sheet 13A, it is possible to obtain the secondary battery 1 by, for example, peeling the substrate 14 from the electrolyte sheet 13A and layering the positive electrode 6, the electrolyte layer 7, and the negative electrode 8 via lamination. At this time, lamination is carried out such that the electrolyte layer 7 is positioned on the side of the positive electrode mixture layer 10 of the positive electrode 6 and on the side of the negative electrode mixture layer 12 of the negative electrode 8, that is, such that the positive electrode current collector 9, the positive electrode mixture layer 10, the electrolyte layer 7, the negative electrode mixture layer 12, and the negative electrode current collector 11 are placed in this order.

In the third step, in another embodiment, the electrolyte layer 7 is formed by kneading a material to be used for the electrolyte layer 7, sandwiching the kneaded product obtained between sheets of a resin such as polytetrafluoroethylene (PTFE), and pressing the product by a roll press machine or the like to produce an electrolyte sheet.

Second Embodiment

Figure 5:
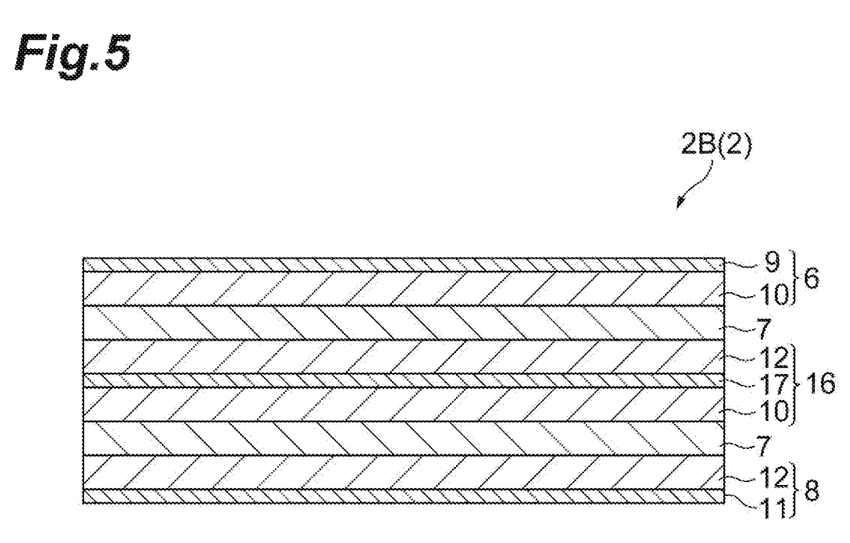
FIG. 5 is a schematic cross sectional view showing one embodiment of an electrode group in the secondary battery according to Second Embodiment.

Subsequently, a secondary battery according to Second Embodiment will be described. FIG. 5 is a schematic cross sectional view showing one embodiment of an electrode group in the secondary battery according to Second Embodiment. As shown in FIG. 5, the point where the secondary battery in Second Embodiment is different from the secondary battery of First Embodiment is that an electrode group 2B comprises a bipolar electrode 16. That is, the electrode group 2B comprises a positive electrode 6, a first electrolyte layer 7, a bipolar electrode 16, a second electrolyte layer 7, and a negative electrode 8 in this order.

The bipolar electrode 16 comprises a bipolar electrode current collector 17, a positive electrode mixture layer 10 provided on the surface of the side of the negative electrode 8 (positive electrode surface) of the bipolar electrode current collector 17, and a negative electrode mixture layer 12 provided on the surface of the side of the positive electrode 6 (negative electrode surface) of the bipolar electrode current collector 17.

In the bipolar electrode current collector 17, the positive electrode surface may be preferably formed with a material excellent in oxidation resistance and may be formed with aluminum, stainless steel, titanium or the like. The negative electrode surface in the bipolar electrode current collector 17 in which graphite or an alloy is used as the negative electrode active material may be formed with a material that does not form an alloy with lithium, and may be specifically formed with stainless steel, nickel, iron, titanium or the like. When different metals are used in the positive electrode surface and the negative electrode surface, the bipolar electrode current collector 17 may be a clad material, in which different types of metal foils are laminated. However, in the case where a negative electrode 8 that operates at a potential at which no alloy with lithium is formed, such as lithium titanate, is employed, the aforementioned limitation is eliminated, and the negative electrode surface may be the same material as the positive electrode current collector 9. In that case, the bipolar electrode current collector 17 may be a single metal foil. The bipolar electrode current collector 17 as a single metal foil may be an aluminum perforated foil having pores of which pore diameter is 0.1 to 10 mm, an expanded metal, a foamed metal sheet or the like. The bipolar electrode current collector 17 may be formed with any material other than those described above as long as the material is not subject to change such as dissolution and oxidation during use of the battery, and additionally, its shape, production method and the like are not limited.

The thickness of the bipolar electrode current collector 17 may be 10 µm or more and 100 µm or less. From the viewpoint of reducing the total volume of the positive electrode, the thickness is preferably 10 µm or more and 50 µm or less, and from the viewpoint of winding the bipolar electrode at a small curvature on forming a battery, the thickness is more preferably 10 μm or more and 20 μm or less.

Subsequently, a method for producing the secondary battery according to Second Embodiment will be described. The method for producing the secondary battery according to the present embodiment comprises a first step of forming the positive electrode mixture layer 10 on the positive electrode current collector 9 to obtain the positive electrode 6, a second step of forming the negative electrode mixture layer 12 on the negative electrode current collector 11 to obtain the negative electrode 8, a third step of forming the positive electrode mixture layer 10 on one surface of the bipolar electrode current collector 17 and forming the negative electrode mixture layer 12 on the other surface to obtain the bipolar electrode 16, and a fourth step of providing the electrolyte layer 7 each between the positive electrode 6 and the bipolar electrode 16 and between the negative electrode 8 and the bipolar electrode 16.

The first step and the second step may be methods similar to the first step and the second step in First Embodiment.

In the third step, the method for forming the positive electrode mixture layer 10 on one surface of the bipolar electrode current collector 17 may be a method similar to the first step in First Embodiment. The method for forming the negative electrode mixture layer 12 on the other surface of the bipolar electrode current collector 17 may be a method similar to the second step in First Embodiment.

Of the fourth step, as the method for providing the electrolyte layer 7 between the positive electrode 6 and the bipolar electrode 16, in one embodiment, the electrolyte layer 7 is formed by producing an electrolyte sheet by use of an electrolyte composition. The method for producing the electrolyte sheet may be a method similar to the method for producing the electrolyte sheets 13A and 13B in First Embodiment.

In the fourth step, the method for providing the electrolyte layer 7 between the negative electrode 8 and the bipolar electrode 16 may a method similar to the method for providing the electrolyte layer 7 between the positive electrode 6 and the bipolar electrode 16 mentioned above.

EXAMPLES

Hereinbelow, the present invention will be described more specifically according to Examples, but the present invention is not intended to be limited to these Examples.

Example 1-1

<Production of Electrolyte Layer>

Lithium bis(trifluoromethanesulfonyl)imide (Li[TFSI]) dried under a dry argon atmosphere was used as an electrolyte salt, and the electrolyte salt was dissolved at a concentration of 1.5 mol/L in N,N-diethyl-N-methyl-N-(2-methoxyethyl)ammonium bis(trifluoromethanesulfonyl)imide ([DEME][TFSI]) as an ionic liquid (hereinbelow, when the composition of the ionic liquid in which the electrolyte salt is dissolved is indicated, the composition may be noted as "concentration of electrolyte salt/type of electrolyte salt/type of ionic liquid"). Next, a copolymer of vinylidene fluoride and hexafluoropropylene (PVDF-HFP) as a polymer and. $SiO_2$ particles surface-treated with silazane (hexamethyldisilazane), "RX50" (product name: AEROSIL RX50, manufactured by Nippon Aerosil Co., Ltd., specific surface area: 35 $m^2/g$, average primary particle size: about 40 nm) as oxide particles having a hydrophobic surface were mixed, and then, N-methyl-2-pyrrolidone (NMP) as a dispersion medium was added thereto to produce a slurry. An ionic liquid in which the aforementioned electrolyte salt was dissolved (1.5 mol/L/Li[TFSI]/[DEME][TFSI]) was further added to this slurry and mixed to thereby obtain a slurry of the electrolyte composition. In this time, the mass ratio of the polymer, the oxide particles, and the ionic liquid in which the electrolyte salt was dissolved in the electrolyte composition was polymer:oxide particles:ionic liquid in which the electrolyte salt was dissolved=34:23:43. Thereafter, NMP was further added thereto to adjust the viscosity, and this slurry was applied on a substrate made of polyethylene terephthalate (product name: Teonex R-Q51, Teijin DuPont Films Limited, thickness: 38 μm) using an applicator. The dispersion medium was vaporized by heating and drying the applied slurry at 80° C. for an hour to obtain an electrolyte sheet. The obtained electrolyte sheet was punched out to a diameter of 16 mm to form an electrolyte layer.

<Production of Positive Electrode>

A positive electrode mixture slurry was prepared by mixing 78.5 parts by mass of a layered lithium nickel manganese cobalt composite oxide (positive electrode active material), 5 parts by mass of acetylene black (conductive agent, average particle size: 48 nm, product name: HS-100, Denka Co., Ltd.), 2.5 parts by mass of a copolymer solution of vinylidene fluoride and hexafluoropropylene (binding agent, solid content 12% by mass and 14 parts by mass of an ionic liquid in which an electrolyte salt was dissolved (1.5 mol/L/Li[FSI]/[Py13][FSI] (N-methyl-N-propylpyrrolidinium bis(fluorosulfonyl)imide)). This positive electrode mixture slurry was coated on a current collector (aluminum foil of 20 μm in thickness) an amount coated of 147 $g/m^2$ and the coated slurry was dried at 80° C. to form a positive electrode mixture layer of a mixture density of 2.9 $g/cm^3$. This layer was punched out to a diameter of 1.5 mm to form a positive electrode, <Production of Negative Electrode>

A negative electrode mixture slurry was prepared by mixing 78 parts by mass of graphite 1 (negative electrode active material, manufactured by Hitachi Chemical Co., Ltd.), 2.4 parts by mass of graphite 2 (negative electrode active material, manufactured by Nippon Graphite Industries, Co., Ltd.), 0.6 parts by mass of carbon fiber (conductive agent, product name: VGCF-H, Showa Denko K. K.), 5 parts by mass of a copolymer solution of vinylidene fluoride and hexafluoropropylene (binding agent, solid content 12% by mass), and 14 parts by mass of an ionic liquid in which the electrolyte salt was dissolved (1.5 mol/L/Li[FSI]/[Py13][FSI]). This negative electrode mixture slurry was coated on a current collector (copper foil of 10 μm in thickness) in an amount coated of 68 $g/m^2$ and the coated slurry was dried at 80° C. to form a negative electrode mixture layer of a mixture density of 1.9 $g/cm^3$. This was punched out to a diameter of 16 mm to form a negative electrode.

<Production of Coin-Type Battery for Evaluation>

The positive electrode, the electrolyte layer, and the negative electrode were used to produce a coin-type battery for evaluation. The positive electrode, the electrolyte layer, and the negative electrode were layered in this order and placed in a CR2032-type coin cell case, and then, the top of the battery case was crimp-sealed via an insulating gasket.

Example 1-2

A coin-type battery was produced in the same manner as in Example 1-1 except that $SiO_2$ particles surface-treated with siloxane (dimethylsilicone oil) "RY50" (product name: AEROSIL RY50, manufactured by Nippon Aerosil Co., Ltd., specific surface area: 30 m$^2$/g, average primary particle size: about 40 nm) were used as the oxide particles having a hydrophobic surface, instead of the SiO$_2$ particles used in Example 1-1, in the production of the electrolyte layer.

Example 1-3

A coin-type battery was produced in the same manner as in Example 1-1 except that SiO$_2$ particles surface-treated with (meth)acryloyl group-containing silane "RM50" (product name: AEROSIL RM50, manufactured by Nippon Aerosil Co., Ltd., specific surface area: 50 m$^2$/g, average primary particle size: about 40 nm) were used as the oxide particles having a hydrophobic surface, instead of the SiO$_2$ particles used in Example 1-1, in the production of the electrolyte layer.

Example 1-4

A coin-type battery was produced in the same manner as in Example 1-1 except that 1.5 mol/L/Li[FSI]/[Py13][FSI] was used as the ionic liquid in which the electrolyte salt was dissolved, instead of 1.5 mol/L/Li[TFSI]/[DEME][TFSI] used in Example 1-1, in the production of the electrolyte layer.

Example 1-5

A coin-type battery was produced in the same manner as in Example 1-4 except that the mass ratio of the polymer, the oxide particles, and the ionic liquid in which the electrolyte salt was dissolved in the electrolyte composition was changed to (polymer:oxide particles:ionic liquid in which the electrolyte salt was dissolved)=30:20:50 in the production of the electrolyte layer.

Example 1-6

A coin-type battery was produced in the same manner as in Example 1-1 except that SiO$_2$ particles surface-treated with silazane (hexamethyldisilazane) "RX200" (product name: AEROSIL RX200, manufactured by Nippon Aerosil Co., Ltd., specific surface area: 140 m$^2$/g, average primary particle size: about 12 nm) were used as the oxide particles having a hydrophobic surface, instead of the SiO$_2$ particles used in Example 1-1, in the production of the electrolyte layer.

Example 1-7

A coin-type battery was produced in the same manner as in Example 1-6 except that the mass ratio of the polymer, the oxide particles, and the ionic liquid in which the electrolyte salt was dissolved in the electrolyte composition was changed to (polymer:oxide particles:ionic liquid in which the electrolyte salt was dissolved)=30:20:50 in the production of the electrolyte layer.

Comparative Example 1-1

A coin-type battery was produced in the same manner as in Example 1-1 except that hydrophilic SiO$_2$ particles not surface-treated "S5130" (product name: S5130, manufactured by Sigma-Aldrich Co. LLC., specific surface area: 395 m$^2$/g, average primary particle size: about 7 nm) were used, instead of the SiO$_2$ particles used in Example 1-1, and the mass ratio of the polymer, the oxide particles, and the ionic liquid in which the electrolyte salt was dissolved was changed to 22:22:56 in the production of the electrolyte layer.

<Evaluation of Discharge Characteristics>

The discharge capacity at 25° C. of the obtained coin-type batteries of Examples 1-1 to 1-7 and Comparative Example 1-1 was measured using a charge and discharge device (manufactured by TOYO SYSTEM Co., Ltd.) under the following charge and discharge conditions.

(1) After constant-current and constant-voltage (CCCV) charging was performed at a termination voltage of 4.2 V and 0.05 C, three cycles of constant-current (CC) discharging at 0.05 C to a termination voltage of 2.7 V were performed, and the discharge capacity was determined. It should be noted that C means "current value [A]/battery capacity [Ah]".

(2) Then, after constant-current and constant-voltage (CCCV) charging was performed at a termination voltage of 4.2 V and 0.1 C, one cycle of constant-current (CC) discharging at 0.5 C to a termination voltage of 2.7 V was performed, and the discharge capacity was determined.

From the obtained discharge capacity, the discharge characteristics (%) were calculated using the following expression. It can be said that the larger the value of the discharge characteristics, the more excellent. The case of the discharge characteristics of 90% or more is evaluated as "A", and the case of the discharge characteristics of less than 90% is evaluated as "B". The results are shown in Table 1.

Discharge characteristics (%)=discharge capacity obtained in (2)/discharge capacity obtained in the third cycle in (1)×100

TABLE 1

| | Polymer | Oxide particles | | |
|---|---|---|---|---|
| | Content (% by mass) | Name (type) | Surface treatment: Yes/No | Content (% by mass) |
| Example 1-1 | 34 | RX50 (SiO$_2$) | Yes | 23 |
| Example 1-2 | 34 | RY50 (SiO$_2$) | Yes | 23 |
| Example 1-3 | 34 | RM50 (SiO$_2$) | Yes | 23 |
| Example 1-4 | 34 | RX50 (SiO$_2$) | Yes | 23 |
| Example 1-5 | 30 | RX50 (SiO$_2$) | Yes | 20 |
| Example 1-6 | 34 | RX200 (SiO$_2$) | Yes | 23 |
| Example 1-7 | 30 | RX200 (SiO$_2$) | Yes | 20 |
| Comparative Example 1-1 | 22 | S5130 (SiO$_2$) | No | 22 |

TABLE 1-continued

|  | Ionic liquid in which the electrolyte salt is dissolved | | | Discharge characteristics |
|---|---|---|---|---|
|  | Type of electrolyte salt | Type of ionic liquid | Content (% by mass) |  |
| Example 1-1 | Li[TFSI] | [DEME][TFSI] | 43 | A |
| Example 1-2 | Li[TFSI] | [DEME][TFSI] | 43 | A |
| Example 1-3 | Li[TFSI] | [DEME][TFSI] | 43 | A |
| Example 1-4 | Li[FSI] | [Py13][FSI] | 43 | A |
| Example 1-5 | Li[FSI] | [Py13][FSI] | 50 | A |
| Example 1-6 | Li[TFSI] | [DEME][TFSI] | 43 | A |
| Example 1-7 | Li[TFSI] | [DEME][TFSI] | 50 | A |
| Comparative Example 1-1 | Li[TFSI] | [DEME][TFSI] | 56 | B |

Example 2-1

<Production of SiO$_2$ Particles Surface-Treated with Phenyltriethoxysilane>

SiO$_2$ particles surface-treated with phenyltriethoxysilane were produced by a wet method. An acetic acid aqueous solution adjusted to pH 4 and ethanol were mixed at a mass ratio of 9:1 to prepare a mixed solution. The hydrophilic SiO$_2$ particles not surface-treated, which were used in Comparative Example 1-1, were added to this mixed solution, and the mixture was stirred for 10 minutes. Then, phenyltriethoxysilane (product name: KBE-103, manufactured by Shin-Etsu Chemical Co., Ltd.) was added to the hydrophilic SiO$_2$ particles so as to achieve 1% by mass, and the mixture was stirred for further 10 minutes. The mixed solution was filtered under reduced pressure, and the obtained powder (solid) was dried at 100° C. and pulverized to obtain SiO$_2$ particles surface-treated with phenyltriethoxysilane. The specific surface area of the obtained SiO$_2$ particles was 395 m$^2$/g, and the average primary particle size thereof was about 7 nm.

<Production of Electrolyte Layer>

Li[TFSI] dried under a dry argon atmosphere was used as an electrolyte salt, and the electrolyte salt was dissolved in [DEME][TFSI] as an ionic liquid at a concentration of 1.5 mol/L. The obtained ionic liquid in which the electrolyte salt was dissolved and the SiO$_2$ particles surface-treated with phenyltriethoxysilane produced as mentioned above were mixed at a volume ratio (ionic liquid in which the electrolyte salt was dissolved: SiO$_2$) of 80:20 under stirring in methanol for 30 minutes or more. Thereafter, the mixture was distilled at 60° C. using an evaporator. The mixture obtained by the distillation and polytetrafluoroethylene were mixed at a mass ratio (mixture:polytetrafluoroethylene of 95:5 and kneaded using a mortar for 30 minutes or more to obtain an electrolyte composition. At this time, the mass ratio of the polymer, the oxide particles, and the ionic liquid in which the electrolyte salt was dissolved in electrolyte composition was (polymer:oxide particles:ionic liquid in which the electrolyte salt was dissolved)=5:40:55. The obtained electrolyte composition was sandwiched between two polytetrafluoroethylene (PTFE) sheets and pressed by a roll press machine to obtain an electrolyte sheet of 50 μm in thickness. This electrolyte sheet was punched out to a diameter of 16 mm to form an electrolyte layer.

<Production of Coin-Type Battery for Evaluation and Evaluation of Discharge Characteristics>

A coin-type battery was produced in the same manner as in Example 1-1 except that the obtained electrolyte layer was used, and an evaluation similar to that in Example 1-1 was performed. The results are shown in Table 2.

Comparative Example 2-1

A coin-type battery of Comparative Example 2-1 was produced in the same manner as in Example 2-1 except that the hydrophilic SiO$_2$ particles not surface-treated, which were used in Comparative Example 1-1, were used, instead of the SiO$_2$ particles surface-treated with phenyltriethoxysilane, which were used in Example 2-1, in the production of the electrolyte layer, and an evaluation similar to that in Example 1-1 was performed. The results are shown in Table 2.

TABLE 2

|  | Polymer | Oxide particles | | |
|---|---|---|---|---|
|  | Content (% by mass) | Type | Surface treatment: Yes/No | Content (% by mass) |
| Example 2-1 | 5 | SiO$_2$ | Yes | 40 |
| Comparative Example 2-1 | 5 | SiO$_2$ | No | 40 |

|  | Ionic liquid in which the electrolyte salt is dissolved | | | Discharge characteristics |
|---|---|---|---|---|
|  | Type of electrolyte salt | Type of ionic liquid | Content (% by mass) |  |
| Example 2-1 | Li[TFSI] | [DEME][TFSI] | 55 | A |
| Comparative Example 2-1 | Li[TFSI] | [DEME][TFSI] | 55 | B |

As shown in Table 1, the secondary batteries using the electrolyte composition of each of Examples 1-1 to 1-7 comprising the oxide particles having a hydrophobic surface were more excellent in discharge characteristics than the secondary battery using the electrolyte composition of Comparative Example 1-1 comprising the oxide particles having no hydrophobic surface. Also, as shown in Table 2, in comparison between Example 2-1 and Comparative Example 2-1, similarly, the secondary battery using the electrolyte composition of Example 2-1 was more excellent in discharge characteristics than the secondary battery using the electrolyte composition of Comparative Example 2-1. From these, it has been confirmed that the electrolyte composition of the present invention enables production of secondary batteries excellent in discharge characteristics.

REFERENCE SIGNS LIST

1 . . . secondary battery, 6 . . . positive electrode, 7 . . . electrolyte layer, 8 . . . negative electrode, 9 . . . positive electrode current collector, 10 . . . positive electrode mixture layer, 11 . . . negative electrode current collector, 12 . . . negative electrode mixture layer, 13A, 13B . . . electrolyte sheet, 14 . . . substrate

The invention claimed is:

1. An electrolyte composition comprising:
   at least one matrix polymer;
   $SiO_2$ particles having a hydrophobic surface and a specific surface area of 2 $m^2/g$ or more and 35 $m^2/g$ or less;
   at least one electrolyte salt selected from the group consisting of a lithium salt, a sodium salt, a calcium salt, and a magnesium salt; and
   an ionic liquid.

2. The electrolyte composition according to claim 1, wherein the $SiO_2$ particles are surface-treated with a silicon-containing compound.

3. The electrolyte composition according to claim 2, wherein the silicon-containing compound is at least one selected from the group consisting of an alkoxy silane, an epoxy group-containing silane, an amino group-containing silane, a (meth)acryloyl group-containing silane, a silazane, and a siloxane.

4. The electrolyte composition according to claim 1, wherein the ionic liquid comprises, as a cationic component, at least one selected from the group consisting of a quaternary onium cation in a chain form, a piperidinium cation, a pyrrolidinium cation, a pyridinium cations, and an imidazolium cation.

5. The electrolyte composition according to claim 1, wherein the ionic liquid comprises, as an anionic component, at least one of anionic components represented by the following formula (A):

$$N(SO_2C_mF_{2m+1})(SO_2C_nF_{2n+1})^- \qquad (A)$$

where m and n each independently represent an integer of 0 to 5.

6. The electrolyte composition according to claim 1, wherein the at least one matrix polymer has a first structural unit selected from the group consisting of a tetrafluoroethylene and a vinylidene fluoride.

7. The electrolyte composition according to claim 6, wherein the first structural unit and a second structural unit selected from the group consisting of a hexafluoropropylene, an acrylic acid, a maleic acid, an ethyl methacrylate, and a methyl methacrylate are comprised in structural units constituting the at least one matrix polymer.

8. The electrolyte composition according to claim 1, wherein the electrolyte salt is an imide-based lithium salt.

9. A secondary battery comprising:
   a positive electrode;
   a negative electrode; and
   an electrolyte layer comprising the electrolyte composition according to claim 1 provided between the positive electrode and the negative electrode.

10. A method for producing an electrolyte sheet, the method comprising:
    obtaining a slurry by dispersing the electrolyte composition according to claim 1 in a dispersion medium; and
    obtaining the electrolyte sheet by applying the slurry on a base material and then volatilizing the dispersion medium.

11. An electrolyte sheet produced by a method comprising:
    obtaining a slurry by dispersing the electrolyte composition according to claim 1 in a dispersion medium; and
    obtaining the electrolyte sheet by applying the slurry on a base material and then volatilizing the dispersion medium.

12. The electrolyte sheet according to claim 11, wherein the electrolyte sheet does not include a separator.

* * * * *